March 20, 1956
L. C. STEARMAN ET AL
2,738,639
CUTTING APPARATUS
Filed Sept. 8, 1953
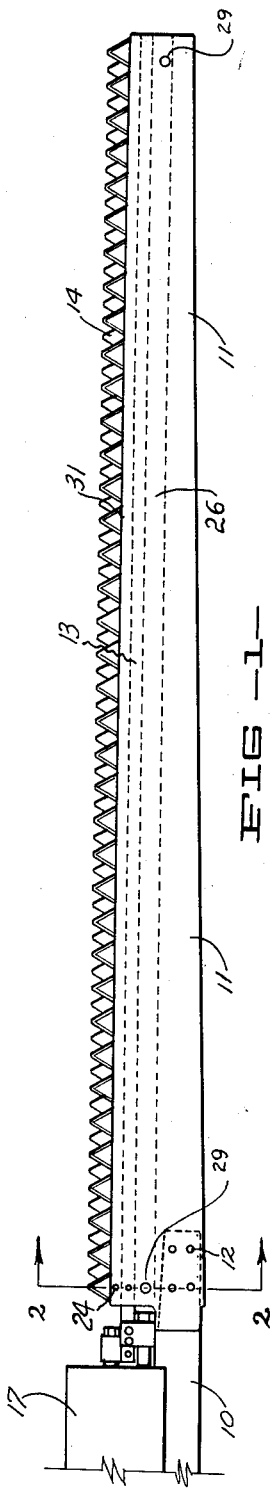
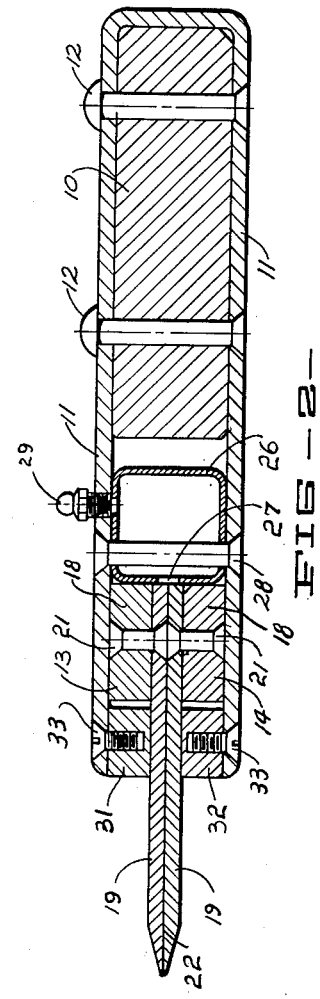
INVENTORS
Lloyd C. Stearman
BY William E. Hamel
ATTORNEYS

United States Patent Office 2,738,639
Patented Mar. 20, 1956

2,738,639

CUTTING APPARATUS

Lloyd C. Stearman and William E. Hamel, Dos Palos, Calif., assignors to Allen C. Wait, trustee of the estate of Stearman-Hamel, Inc., a corporation of California Application September 8, 1953, Serial No. 378,795

4 Claims. (Cl. 56—297)

This invention relates generally to a cutting apparatus for mowing machines.

In the past, operators of mowing machines have had many difficulties with conventional sickle bars in that they have gummed up easily. This gumming up, caused by the hardening of plant juices and dirt accumulating on the sickle bar, greatly increases friction and often makes the mowing machine very difficult to operate. Frequently this gummed up material must be removed necessitating a tedious scraping or soaking operation since normal, periodic lubrication is not adequate to prevent this gumming up.

In general, it is an object of our invention to provide an improved cutting apparatus which will prevent gumming of the sickle bar due to accumulation of dirt and plant juices and other foreign material on the sickle bar.

Another object of this invention is to provide an improved device of this kind which will make the mowing machine easier to operate and at the same time prolong the life of the sickle bar.

A further object of the invention is to provide adequate lubrication to the moving parts of the cutting apparatus.

Other objects and advantages of this invention will appear from the following description taken in conjunction with the accompanying drawing.

Referring to the drawing:

Figure 1 is a plan view of my sickle bar.

Figure 2 is an enlarged cross sectional view taken along the line 2—2 of Figure 1.

In general our invention consists of a cutting apparatus wherein its moving parts are supplied with adequate lubrication to prevent the accumulation of foreign matter on the sickle bar and the cutting blades and also to reduce friction.

The embodiment of our cutting apparatus shown in the drawing consists of a carrier bar 10 which is adapted to be mounted upon a mowing machine. A housing 11 formed of a U-shaped member is mounted on the carrier bar by suitable means such as rivets 12 and serves to enclose a pair of superposed sickle bar assemblies 13 and 14. The sickle bar assemblies are slidably mounted within the housing and have their respective ends connected to conventional operating means 17 for reciprocating the sickle bar assemblies longitudinally of the housing in opposite directions with respect to each other.

Each of the sickle bar assemblies 13 and 14 is comprised of a sickle bar 18 and a plurality of cutting blades 19 mounted side by side lengthwise of the sickle bar by suitable means such as rivets 21. The inner cutting faces of the cutting blades define a cutting plane 22 therebetween.

An elongated grease container 26 is mounted within the housing to the rear of the sickle bar assemblies and forms the rear wall of a guideway for the sickle bar assemblies. The grease container has an elongated grease delivery slot 27 in communication with the rear edges of the cutting blades. The grease container is fixed within the housing by suitable means such as rivets 28. Any suitable means may be provided for delivering grease to the grease container such as pressure grease gun fittings 29.

A pair of bar-like members 31 and 32 are mounted on the front portion of the housing 11 by suitable means such as screws 33 and form the front wall of the guideway for the sickle bar assemblies. The cutting blades 19 of the sickle bar assemblies extend through an elongated slot 34 defined by members 31 and 32. It can be seen that the U-shaped housing 11, the front wall of grease container 26 and the bar-like members 31 and 32 serve to define a rectangularly shaped guideway for the sickle bar assemblies 13 and 14.

The bar-like members 31 and 32 serve as grease retainers in a manner hereinafter described. They may be removed to facilitate easy removal of the sickle bar assemblies 13 and 14.

Operation of our device may now be briefly described as follows:

Let it be assumed that sufficient grease has been inserted into grease retainer 26 through the grease gun fittings 29. The grease will tend to flow out of grease dispensing slot 27 into the running clearances between the cutting blades and between the sickle bars and the housing. It will be appreciated that the sickle bar assemblies are rather snugly mounted within the guideway, however, there are sufficient clearances (often termed "running clearances") between the guideway and the sickle bar assemblies to allow reciprocation of the sickle bar assemblies. The grease from the dispensing slot will flow into these running clearances, particularly when the sickle bar assemblies are being reciprocated.

The grease dispensing slot 27 is in contact with the rear edge of the cutting blades, and so grease will also be urged into the clearances between the cutting blades.

Since the grease will have a tendency to progress from the grease container into the running clearances toward the front portion of the cutting blades, the grease will serve to prevent foreign material such as plant juices, dirt and the like from entering into these running clearances while the mower is being operated. Thus, the grease in the grease container keeps the moving parts of our cutting apparatus well lubricated at all times and at the same time prevents the entrance of foreign matter.

It will be apparent from the foregoing that we have provided an improved cutting apparatus wherein lubrication is provided for all sliding surfaces and at the same time prevents the accumulation of foreign matter thereby preventing excessive friction and wear to the moving parts.

We claim:

1. In a cutting apparatus, a pair of superposed sickle bar assemblies, a housing enclosing said sickle bar assemblies, means at the corresponding ends of said sickle bar assemblies for reciprocating the same longitudinally within the housing in opposite directions with respect to each other, each of said sickle bar assemblies comprising a sickle bar and a plurality of cutting blades mounted side by side lengthwise of the bar, the cutting blades of the sickle bars defining a cutting plane therebetween, an elongated grease retainer within said housing mounted to the rear of said sickle bar assemblies, said grease retainer having an elongated grease delivery slot in communication with the rear edges of said cutting blades, and means for delivering grease to said grease retainer.

2. Apparatus as in claim 1 wherein the front wall of the elongated grease container serves as the rear wall of guideway means for said sickle bar assemblies.

3. In a cutting apparatus, a pair of superposed sickle bar assemblies, a housing enclosing said sickle bar assemblies, means at the corresponding ends of said sickle bar assemblies for reciprocating the same longitudinally of the housing and in opposite directions with respect to each other, each of said sickle bar assemblies comprising a sickle bar and a plurality of cutting blades mounted side by side lengthwise of the bar, the cutting blades of the sickle bars defining a cutting plane therebetween, an elongated grease retainer mounted in said housing to the rear of said sickle bar assemblies, said grease retainer having an elongated grease delivery slot in communication with the rear edges of said cutting blades, means for delivering grease to said grease retainer, and a pair of bar-like members mounted in said housing to the front of said sickle bar assemblies and defining an elongated slot through which the cutting blades extend.

4. Cutting apparatus as in claim 3 wherein the housing, the front wall of the grease retainer and the bar-like member serve to define a guideway for said sickle bar assemblies.

References Cited in the file of this patent

UNITED STATES PATENTS

| | | |
|---|---|---|
| 295,814 | Roth | Mar. 25, 1884 |
| 375,237 | Wardall | Dec. 20, 1887 |
| 378,033 | Haynes | Sept. 1, 1903 |
| 834,969 | Clarkson | Nov. 6, 1906 |
| 855,645 | Kryger | June 4, 1907 |
| 1,083,072 | Ferbrache | Dec. 30, 1913 |
| 1,816,868 | Privat | Aug. 4, 1931 |
| 2,146,399 | Landrey | Feb. 7, 1939 |